United States Patent [19]
Mizuhara

[11] Patent Number: 6,075,825
[45] Date of Patent: Jun. 13, 2000

[54] TIMING AND DATA RECOVERY CIRCUIT FOR ULTRA HIGH SPEED OPTICAL COMMUNICATION SYSTEM

[75] Inventor: Osamu Mizuhara, Allentown, Pa.

[73] Assignee: Lucent Technologies, Inc., Murray Hill, N.J.

[21] Appl. No.: 09/003,347

[22] Filed: Jan. 6, 1998

[51] Int. Cl.[7] .................................................. H04L 27/06
[52] U.S. Cl. ........................... 375/316; 375/355; 375/359
[58] Field of Search ...................................... 375/316, 293, 375/294, 355, 359, 361; 359/154, 158, 189

[56] References Cited

U.S. PATENT DOCUMENTS

| | | | |
|---|---|---|---|
| 5,164,966 | 11/1992 | Hershberger | 375/359 |
| 5,589,683 | 12/1996 | Nakai | 375/359 |
| 5,671,258 | 9/1997 | Burns et al. | 375/359 |
| 5,710,649 | 1/1998 | Mollenauer | 359/123 |
| 5,748,325 | 5/1998 | Tulip | 356/437 |
| 5,828,216 | 10/1998 | Tschudin et al. | 324/322 |

*Primary Examiner*—Don N. Vo
*Attorney, Agent, or Firm*—Brown, Pinnisi & Michaels, P.C.

[57] ABSTRACT

In an ultra high speed optical communications system, the clock signal from a data stream in NRZ format is recovered using an inexpensive, low Q filter. Resulting clock jitter is reduced with a clock divider which lowers the speed of the signal by 1/n, where n is a an integer. The divided clock signal is filtered again by a low frequency high Q filter. This invention eliminates the need for a costly high frequency high Q filter, while providing a divided down clock for data de-multiplexing. At the lower speed, an inexpensive D flip flop is used with the divided down clock for data recovery.

10 Claims, 2 Drawing Sheets

TIMING AND DATA RECOVERY CIRCUIT FOR ULTRA HIGH SPEED OPTICAL COMMUNICATION SYSTEM

FIELD OF THE INVENTION

The invention pertains to the field of ultra high speed optical communication systems. More particularly, the invention pertains to a timing and data recovery circuit in a receiver of such a system.

BACKGROUND OF THE INVENTION

Timing and data recovery is a key function in a receiver for an optical communication system. The receiver has major functions including receiving the optical data signal and converting it to electrical signal, recovering the timing signal from the received signal, and recovering the noisy input data signal using the recovered clock. Typically the optical data signal in the high speed system is in a non-return to zero (NRZ) format so that it contains no clock information. Using an NRZ format reduces the total bandwidth required by the system. In order to recover the clock signal from an NRZ format signal, a nonlinear circuit is used to detect the timing information. The output of the nonlinear circuit is then fed to a very high Q bandpass filter in order to extract the clock signal and reduce the NRZ data pattern effect. "Q" is a measure of selectivity in filters; the higher the Q, the more selective the filter response becomes. The clock is amplified and limited to suppress the AM component of the signal that is due to the data pattern itself.

As the signal speed exceeds 10Gb/s, the timing recovery becomes difficult and costly, mainly due to the high Q filter and associated components that are required. Data recovery is done by a high sensitivity D type flip flop, which becomes more costly as the signal speed increases. In general, high speed components are costly.

SUMMARY OF THE INVENTION

Briefly stated, in an ultra high speed optical communications system, the clock signal from a data stream in NRZ format is recovered using an inexpensive, low Q filter. Resulting clock jitter is reduced with a clock divider which lowers the speed of the signal by 1/n, where n is a an integer. The divided clock signal is filtered again by a low frequency high Q filter. This invention eliminates the need for a costly high frequency high Q filter, while providing a divided down clock for data de-multiplexing. At the lower speed, an inexpensive D flip flop is used with the divided down clock for data recovery.

According to an embodiment of the invention, a timing and data recovery circuit for a data stream in an ultra high speed optical communications system, said data stream being in an NRZ format, includes (a) a nonlinear circuit for extracting a clock signal from said data stream, wherein said nonlinear circuit receives said data stream as an input and produces an output, (b) a low Q bandpass filter receiving said output from said nonlinear circuit as an input and producing an output, (c) a divider circuit receiving said output from said low Q bandpass filter as an input having a first frequency and producing an output having a second frequency that is 1/n said first frequency, where n is an integer greater than one, (d) a high Q bandpass filter receiving said output from said divider circuit and producing a final clock signal, (e) n number of decision circuits, each of said decision circuits receiving said data stream as an input and processing a portion of said data stream at a processing speed of said final clock signal, wherein an output of each decision circuit is a plurality of data bits, and (f) at least one de-multiplexer receiving said outputs of said decision circuits and separating said data bits into a plurality of output channels.

According to an embodiment of the invention, a timing and data recovery circuit for a data stream in an ultra high speed optical communications system, said data stream being in an NRZ format, includes (a) extraction means, including nonlinear processing means and first filter means, for extracting a clock signal from said data stream, wherein said extraction means receives said data stream as an input and produces an output, (b) divider means for receiving said output from said extraction means as an input having a first frequency and producing an output having a second frequency that is 1/n said first frequency, where n is an integer greater than one, (c) high Q means for reducing timing jitter, said high Q means receiving said output from said divider circuit and producing a final clock signal, (d) decision means for receiving said data stream as an input and processing said data stream at a processing speed of said final clock signal, wherein an output of said decision means is a plurality of multiplexed data bits, and (e) de-multiplexer means for receiving said plurality of multiplexed data bits and separating said data bits into a plurality of output channels.

According to an embodiment of the invention, a method for recovering timing and data for a data stream in an ultra high speed optical communications system, said data stream being in an NRZ format, includes the steps of (a) extracting a clock signal from said data stream and producing an output, (b) receiving said output, from said step of extracting, as an input having a first frequency and producing an output having a second frequency that is 1/n said first frequency, where n is an integer greater than one, (c) reducing timing jitter, said step of reducing including receiving said output from said step of receiving and producing a final clock signal, (d) processing said data stream at a processing speed of said final clock signal and producing a plurality of multiplexed data bits, and (e) de-multiplexing said plurality of multiplexed data bits and separating said data bits into a plurality of output channels.

DESCRIPTION OF THE PREFERRED EMBODIMENT

Figure 1:
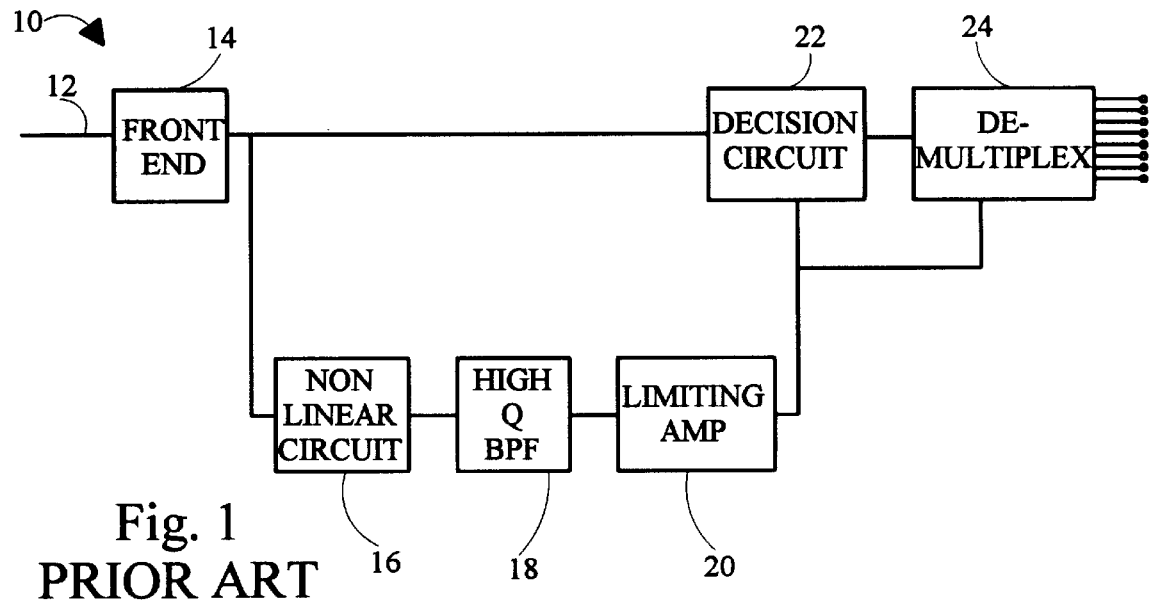
FIG. 1 shows a traditional timing and data recovery circuit according to the prior art.

Referring to FIG. 1, a traditional timing and date recovery circuit 10 is shown. Input data in an NRZ format arrives at a front end 14 from an optical fiber path 12. A nonlinear circuit 16 detects the timing information from the data stream. The output of nonlinear circuit 16 is fed to a very high Q bandpass filter 18 to extract the clock signal and reduce the NRZ data pattern effect. A very high Q is defined as a Q-value greater than about 800. The clock signal is amplified and limited by limiting amplifier 20 to suppress the AM component of the signal that is due to the data pattern itself. The recovered clock signal is fed to a decision circuit 22 and a demultiplexer 24. Decision circuit 22 recovers the 1's and 0's from the data stream, while demultiplexer 24 separates out the different channels of information that were multiplexed together for the data transmission at the transmitting end of the optical communications system.

All of circuit 10 needs to be operational at the rate of the input data speed. The output from the decision circuit drives the de-multiplexer, which must operated at the input data speed. At very high data speeds, these components are costly.

Figure 2:
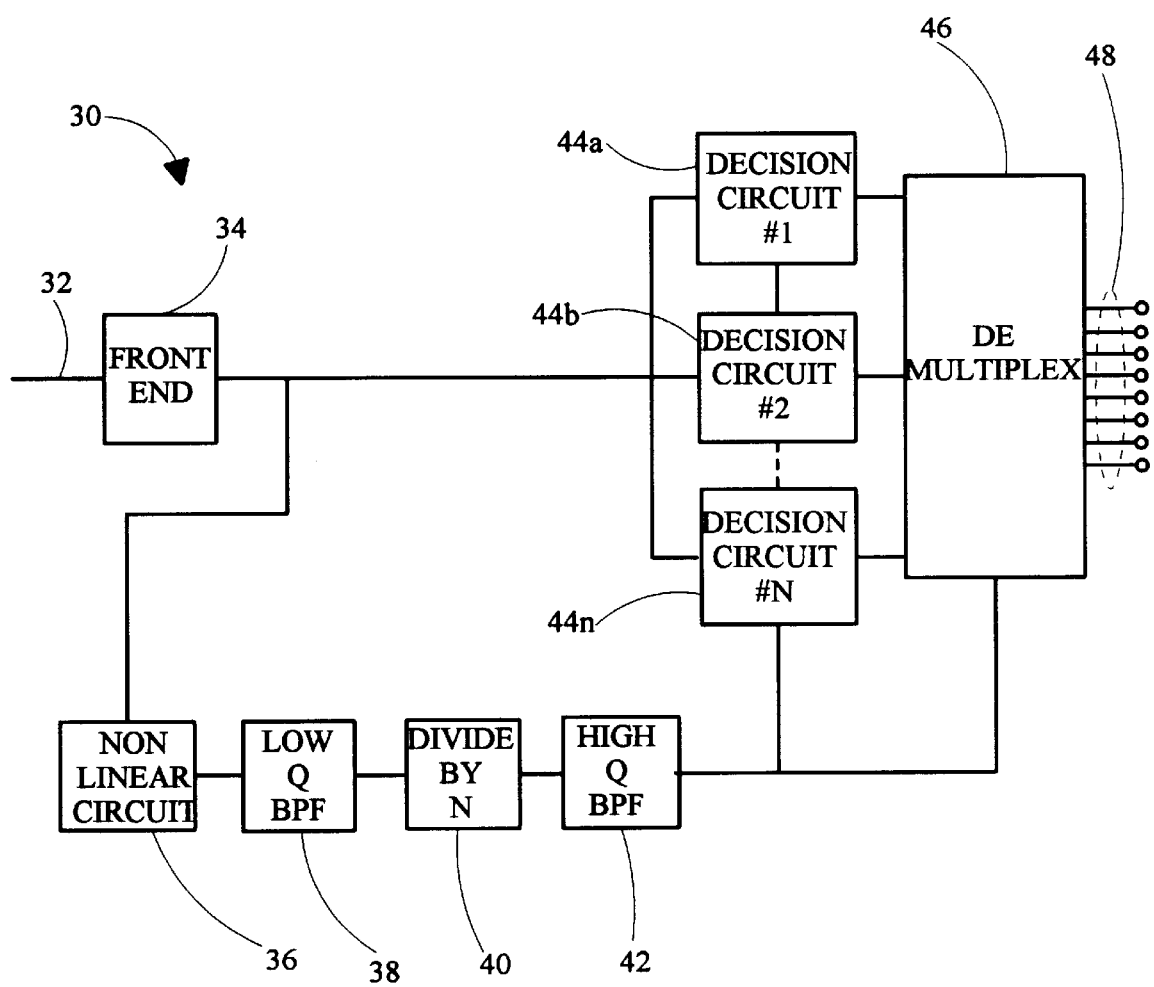
FIG. 2 shows a timing and data recovery circuit according to an embodiment of the present invention.

Referring to FIG. 2, a data and timing recovery circuit 30 is shown. As with the prior art, input data arrives in an NRZ format. The data arrives at a front end 34 from an optical fiber path 32. A nonlinear circuit 36 detects the timing information from the data stream. The output of nonlinear circuit 36 is fed to a preferably low Q bandpass filter 38 instead of a high Q bandpass filter as was the case with the prior art. Although a medium or high Q bandpass filter could be used, a low Q filter is preferable due to its lower cost. A low Q is defined as a Q-value of about 100. Low Q filter 38 extracts the clock signal but does not reduce the NRZ data pattern effect. The output from low Q filter 38 is then fed to a clock divider 40 that divides the clock speed by n, where n is preferably an integer power of 2, to slow the clock signal down.

Due to the low Q on filter 38, the recovered clock signal contains AM pattern effect. Since clock divider 40 is a digital device with a constant level output regardless of the input, the pattern effect is suppressed without the use of a limiting circuit. In addition, the clock period becomes longer while the timing jitter in the recovered clock signal remains the same, thereby resulting in lower jitter at the divider output. The output from clock divider 40 is fed to a low frequency high Q band-pass filter 42 to reduce timing jitter before being sent on to a plurality of decision circuits 44a, 44b, ..., 44n, where the data signal is recovered from the input data stream. The recovered data signal is then de-multiplexed by a de-multiplexer 46 and output over individual channels 48.

Since the clock input to the decision circuit is divided by n, the data recovery and de-multiplexing functions are done at the divided rate. A number of decision circuits are needed to recover all the data by staggering the clock phase. Even though the data input of each decision circuit must be capable of accepting the input data rate instead of the divided rate, the remainder of the decision circuit needs to be operational only at the divided rate. The decision circuits can be easily integrated into the de-multiplexer since the input structure of the de-multiplexer is identical to the decision circuit.

Figure 3:
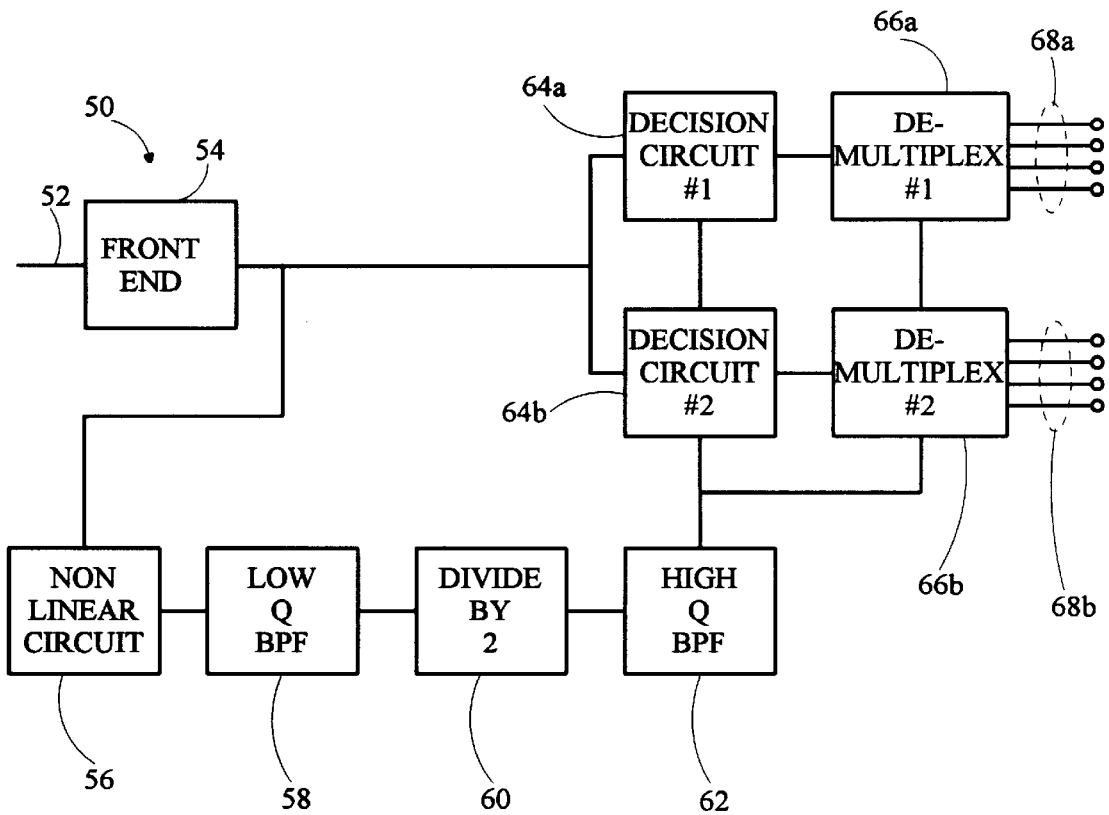
FIG. 3 shows the timing and data recovery circuit of FIG. 2 when n=2.

Referring to FIG. 3, a data and timing recovery circuit is shown for the case of n=2. The input data arrives in an NRZ format at a front end 54 from an optical fiber path 52. A nonlinear circuit 56, essentially a frequency doubler that creates a pulse from both the rising edge and the falling edge of the signal, detects the timing information from the data stream. The output of nonlinear circuit 56 is fed to a low Q bandpass filter 58, where the clock signal is extracted but the NRZ data pattern effect is not reduced. The output from low Q filter 58 is then fed to a clock divider 60, such as a GaAs divider made by NEL (NTT Electronics Technology), that divides the clock speed by 2. The output from clock divider 60 is fed to a low frequency high Q band-pass filter 62, such as a 10 GHz filter manufactured by SMM (Sumitomo Metal Mining), to reduce timing jitter before being sent on to two decision circuits 64a, 64b, such as the GaAs NEL NLG4106, where the data signal is recovered from the input data stream at half the input data rate each. The recovered data signal is then de-multiplexed by two de-multiplexers 66a, 66b, such as the GaAs 1:4 NEL NLG4219, with two sets of low output channels 68a, 68b.

The prior art embodiment of FIG. 1 calls for a 1:8 de-multiplexer at the data rate, whereas the embodiment of FIG. 3 requires two 1:4 de-multiplexers at half the speed. Therefore, less expensive low frequency components can be used in this embodiment, resulting in significant cost savings and higher reliability.

A cost comparison is provided in Table 1. A 20Gb/s data and timing recovery circuit is used in this table. The costs shown in Table 1 are based on the available ICs in the market as of the date of this application.

TABLE 1

|  | Prior Art (FIG. 1) |  | Present Invention (FIG. 3) |  |
|---|---|---|---|---|
| clock extract | HPF + doubler | $700 | HPF + doubler + Watkins-Johnson FD 93H @ | $700 |
| filter at 20 GHz | DRF | $2,500 | low Q homemade @ | $400 |
| divider | N/A |  | GaAs NEL @ | $1,000 |
| filter at 10 GHz | N/A |  | high Q SMM 10 GHz @ | $700 |
| limiting circuit | GaAs | $2,400 | N/A |  |
| decision circuit | GaAs | $2,400 | two GaAs NEL NLG4106 @ | $1,000 each |
| de-multi-plexer | GaAs 1:8 | $3,000 | two GaAs 1:4 NEL NLG4219 @ | $1,000 each |
| TOTAL |  | $11,000 |  | $6,800 |

As shown in the table, there is a substantial cost savings between the present invention and the prior art.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A timing and data recovery circuit for a data stream in an ultra high speed optical communications system, said data stream being in an NRZ format, comprising:

(a) a nonlinear circuit for extracting a clock signal from said data stream, wherein said nonlinear circuit receives said data stream as an input and produces an output;

(b) a low Q bandpass filter receiving said output from said nonlinear circuit as an input and producing an output;

(c) a divider circuit receiving said output from said low Q bandpass filter as an input having a first frequency and producing an output having a second frequency that is 1/n said first frequency, where n is an integer greater than one;

(d) a high Q bandpass filter receiving said output from said divider circuit and producing a final clock signal;

(e) n number of decision circuits, each of said decision circuits receiving said data stream as an input and processing a portion of said data stream at a processing speed of said final clock signal, wherein an output of each decision circuit is a plurality of data bits; and (f) at least one de-multiplexer receiving said outputs of said decision circuits and separating said data bits into a plurality of output channels.

2. The circuit of claim 1, wherein a number of de-multiplexers equals the number n of decision circuits.

3. The circuit of claim 1, wherein n=2.

4. The circuit of claim 2, wherein n=2.

5. A timing and data recovery circuit for a data stream in an ultra high speed optical communications system, said data stream being in an NRZ format, comprising:

(a) extraction means, including nonlinear processing means and first filter means, for extracting a clock signal from said data stream, wherein said extraction means receives said data stream as an input and produces an output;

(b) divider means for receiving said output from said extraction means as an input having a first frequency and producing an output having a second frequency that is 1/n said first frequency, where n is an integer greater than one;

(c) high Q means for reducing timing jitter, said high Q means receiving said output from said divider circuit and producing a final clock signal;

(d) decision means for receiving said data stream as an input and processing said data stream at a processing speed of said final clock signal, wherein an output of said decision means is a plurality of multiplexed data bits; and (e) de-multiplexer means for receiving said plurality of multiplexed data bits and separating said data bits into a plurality of output channels.

6. The circuit of claim 5, wherein said de-multiplexer means includes n de-multiplexer circuits and said decision means includes n decision circuits.

7. The circuit of claim 5, wherein n=2.

8. The circuit of claim 6, wherein n=2.

9. A method for recovering timing and data for a data stream in an ultra high speed optical communications system, said data stream being in an NRZ format, comprising the steps of:

(a) extracting a clock signal from said data stream and producing an output;

(b) receiving said output, from said step of extracting, as an input having a first frequency and producing an output having a second frequency that is 1/n said first frequency, where n is an integer greater than one;

(c) reducing timing jitter, said step of reducing including receiving said output from said step of receiving and producing a final clock signal;

(d) processing said data stream at a processing speed of said final clock signal and producing a plurality of multiplexed data bits; and (e) de-multiplexing said plurality of multiplexed data bits and separating said data bits into a plurality of output channels.

10. The method of claim 9, wherein n=2.

* * * * *